United States Patent [19]

Scheliga

[11] Patent Number: 5,925,303
[45] Date of Patent: *Jul. 20, 1999

[54] PROCESS FOR FORMING SEAMLESS MOLDED SKIRT

[75] Inventor: Werner Scheliga, Scarborough, Canada

[73] Assignee: Unique Mould Makers Limited, Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/837,658

[22] Filed: Apr. 22, 1997

Related U.S. Application Data

[63] Continuation of application No. 08/385,795, Feb. 9, 1995, abandoned.

[51] Int. Cl.[6] .............................. B29C 45/44; B29C 45/20
[52] U.S. Cl. ...................... 264/318; 264/328.9; 264/334; 425/556; 425/577; 425/DIG. 58
[58] Field of Search .................................... 264/318, 334, 264/336, 328.1, 328.9; 425/577, 556, 468, DIG. 58

[56] References Cited

U.S. PATENT DOCUMENTS

| | | | |
|---|---|---|---|
| 3,655,323 | 4/1972 | Hall | 425/438 |
| 4,019,711 | 4/1977 | Altenhof et al. | 249/59 |
| 4,201,360 | 5/1980 | Schwartzburg et al. | 264/318 |
| 4,456,214 | 6/1984 | Ruck et al. | 249/144 |
| 4,610,621 | 9/1986 | Taber et al. | 425/577 |
| 4,618,121 | 10/1986 | Conti | 249/59 |
| 4,709,757 | 12/1987 | Bly | 264/318 |
| 4,756,865 | 7/1988 | Von Holdt | 264/336 |
| 4,873,043 | 10/1989 | Meyers | 264/336 |
| 4,919,608 | 4/1990 | Catalanotti et al. | 425/556 |
| 5,320,795 | 6/1994 | Mitchell et al. | 264/318 |
| 5,387,389 | 2/1995 | Catalanotti et al. | 425/DIG. 58 |
| 5,695,706 | 12/1997 | Welsh et al. | 264/328.1 |

FOREIGN PATENT DOCUMENTS

| | | | |
|---|---|---|---|
| 1123873 | 10/1956 | France . | |
| 148031 | 5/1981 | Germany | 264/318 |
| 57-123017 | 7/1982 | Japan | 264/318 |

*Primary Examiner*—Jill L. Heitbrink
*Attorney, Agent, or Firm*—Weingarten, Schurgin, Gagnebin & Hayes LLP

[57] ABSTRACT

A molded cap for sealing a container, and having a core-profiled internal skirt portion is injection molded within a seamless annular cavity mold, wherein segmentation of the interior core die portion bearing the internal form such as a screw thread form for the inside of the cap skirt, permits its inward withdrawal clear of the cap after completion of the injection cycle. Due to the seamless mold cavity the cap has no externally visible mold witness lines along its skirt. The molded cap contracts radially as it cools within the mold, permitting molded parts and decorative features that are on or in the skirt face to withdraw radially inwardly from the mold surfaces, such that the cap can be ejected clear from the mold without damage to fine detailed or hang-up on undercuts into the mold skirt face.

5 Claims, 7 Drawing Sheets

PROCESS FOR FORMING SEAMLESS MOLDED SKIRT

This application is a continuation of application Application Ser. No. 08/385,795, filed Feb. 9, 1995, now abandoned.

FIELD OF THE INVENTION

This invention is directed to a molded plastic object having a seamless annular skirt, and to apparatus and process for injection molding it.

BACKGROUND ART

Injection molded caps with external undercuts are traditionally molded in cavity dies having a split mold divided into two or more arcuate segments. This usually results in mold separation or "witness" lines visibly extending longitudinally along the skirt portion of the molded cap, coincident with the mold closure lines and possibly also resulting in the presence of flash at the mold closure lines.

A cap is generally pulled from its mold by way of its core die, which militates against the presence of any peripherally extending undercuts in the skirt mold, which would otherwise cause pick-up between cap and mold interior undercut surfaces. Thus, the only usual molding provided on the external surface of the cap skirt comprises axially extending ribs, which can make a clear draw during ejection, or molded protrusions located on a small arc on the axis of withdrawal motion of a mold segment.

From the foregoing it has followed that decoration of the outside surface of a mold skirt, with an absence of mold seams and associated witness lines cannot be satisfactorily accomplished.

SUMMARY OF THE INVENTION

The present invention provides a method of molding a cap within a seamless annular mold. It has been found, in the case of caps of 5.08 cm (2 inches) diameter and greater, that a, collapsing core die can be employed, wherein the core (male) die is in segments, and can collapse inwardly.

The inward retraction or collapse of the core die while the cap is cooling within its mold then permits thermal contraction of the molded article, particularly the cap skirt, radially inwardly away from the inner peripheral wall of the skirt mold portion, for subsequent ejection of the cap from the mold cavity.

It has been found that in the extent of cap radial contraction, in molds of about 5 cm (about 2 inches), a polypropylene cap can shrink approximately 0.762 mm (0.030 inches) diametrically.

This in turn makes possible the application, in caps of about 5 cm diameter and greater, of molded decoration to the peripheral outer surface of the cap skirt of about 0.36 mm (0.014 inches) draw. The provision of such skirt decoration, and an absence of witness lines down the skirt is a major advantage to the user, for marketing the enhanced product.

The present invention thus provides a molded cap with a depending skirt, wherein the skirt has an unmarred surface, free of witness lines.

The subject cap thus has a depending skirt wherein the peripheral outer surface of the skirt may be a continuous, unmarred surface.

The subject cap may include shallow surface deviations integrally molded on or into the outer surface of the skirt.

The aforesaid shallow deviations may be molded all around the periphery of the skirt, and may be in the form of decoration suitable for unimpeded radial contraction inwardly from an undercut mold cavity.

The cap may also carry letters, wording or other significant indicia.

The apparatus provided for carrying out the invention may comprise a cavity mold having a removable core die wherein the core die is retractable from out the mold and its contained hollow molded product.

A three piece collapsing core has been found to be highly effective in this role.

The cavity mold may have a unitary substantially cylindrical, continuous skirt wall for molding a cylindrical hollow object thereagainst.

The mold skirt wall may include shallow undercut portions therein, to enable the molding of a hollow skirted article wherein the skirt of the article includes shallow protrusions extending outwardly from the skirt peripheral surface in shallow, outstanding relation therewith.

Alternatively, the mold skirt wall may include shallow protrusions extending inwardly, to mold undercut portions into the skirt of the article.

The aforesaid outstanding protrusions are generally provided with a slight conical taper or draw to facilitate radial separation between the article skirt and the mold skirt molding surface.

In one embodiment of the subject mold, a core die therein may include a plurality of collapsible skirt segments which, in an assembled, extended condition provide an exterior core molding surface. The use of three core die segments is contemplated.

The mold core exterior molding surface may include necessary surface detail such as ribs or thread land cavities, for the provision of ribs or screw threads to the inner surface of a cap molded within the mold.

In a preferred embodiment there are provided a plurality of axially retractable, tapered core die segments, wherein retraction of the core segments then enables radially inward retraction of the remaining core segments, to achieve radial clearance, thereby enabling axial withdrawal from the interior surfaces of a cap or other hollow product molded within the mold. The interior surfaces of the article are molded, at least in part, by at least some of the withdrawn surface portions of the mold core.

In one embodiment of the subject mold the injector nozzle is located within the core of the mold, the core having an aperture therein connecting in plastic flow-transfer relation with the cavity of the mold.

The subject injector nozzle is at least partially axially withdrawable from the mold core, to facilitate retraction of some of the core segments, thereby enabling the radial inward contraction of the remaining mold core segments, for unimpeded withdrawal of the mold core from a hollow molded object.

A mold built in accordance with the above may have a knock-out incorporated as part of the mold, the knock-out generally comprising an axially displaceable cylinder, the inner end surface thereof forming at least a part of the mold cavity crown portion, in use to mold at least a crown portion of a hollow object manufactured by the mold, and to axially displace the molded hollow object from the mold.

The present invention further provides a method of molding a hollow plastic object having a peripheral skirt portion depending therefrom, including the steps of assembling a closed injection mold having a mold cavity including a core portion in the shape of the desired object, injecting heated plastic in a fluent state into the mold, to fill the cavity; withdrawing the mold core from the hot plastic object; cooling the object in order to promote inward contraction of the peripheral skirt portion in withdrawing relation from the adjoining inner mold surface of the mold; and discharging the cooled object from the mold.

The mold skirt inner surface may include protrusions and/or undercuts of predetermined prominence, relative to the skirt main surface, from which the molded article is free to contract thermally, for subsequent displacement from the mold.

Machine knock-out, air poppet discharge, suction cup or core retraction are all possible object discharge methods.

In a preferred embodiment the mold skirt inner wall may be undercut by one or more shallow decorations, from which the molded object withdraws during cooling thereof within the mold.

It will be understood that the decorations may also consist of undercut insets into the thickness of the skirt of the molded object.

The extent of cooling affects the extent of radial contraction. Thus a 10-second molding cycle time can permit a thermal retractive draw in the range 0.127–0.255 mm (0.005–0.010 inches).

BRIEF DESCRIPTION OF THE DRAWINGS

Certain embodiments of the prior art, and of the invention are described, by way of illustration, and without limitation of the invention thereto, other than as set forth in the following claims, reference being made to the accompanying drawings, wherein:

DETAILED DESCRIPTION OF THE INVENTION

Figure 1:
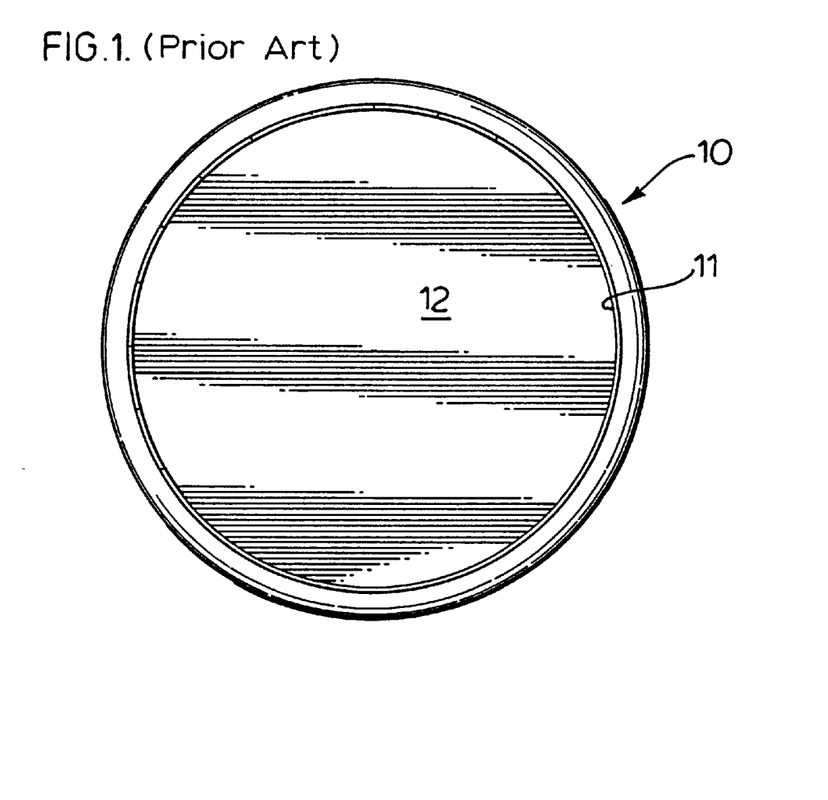
FIGS. 1–5 shows prior art injection molded caps.
Figure 2:
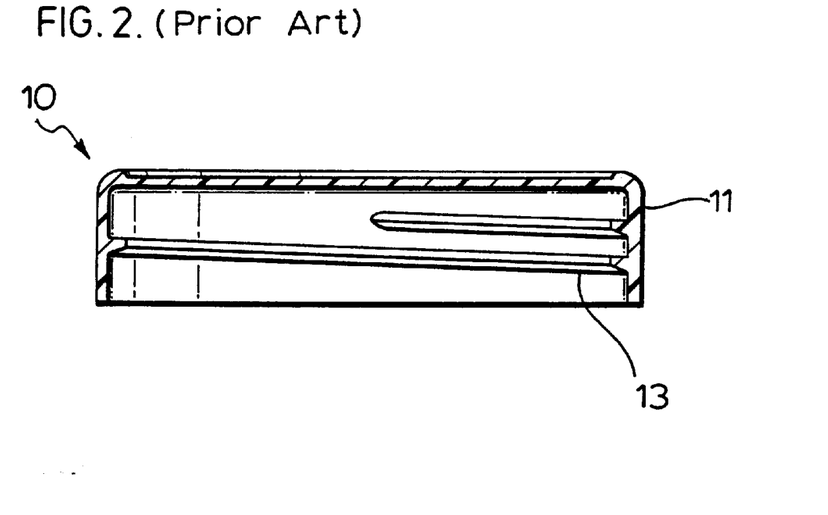

Referring to FIG. 1, this PRIOR ART cap 10, viewed from the bottom, has a skirt portion 11 and crown 12. In the diametrical section of FIG. 2, the skirt portion 11 has two turns of a single start thread 13.

Figures 3, 4, 5, 6:
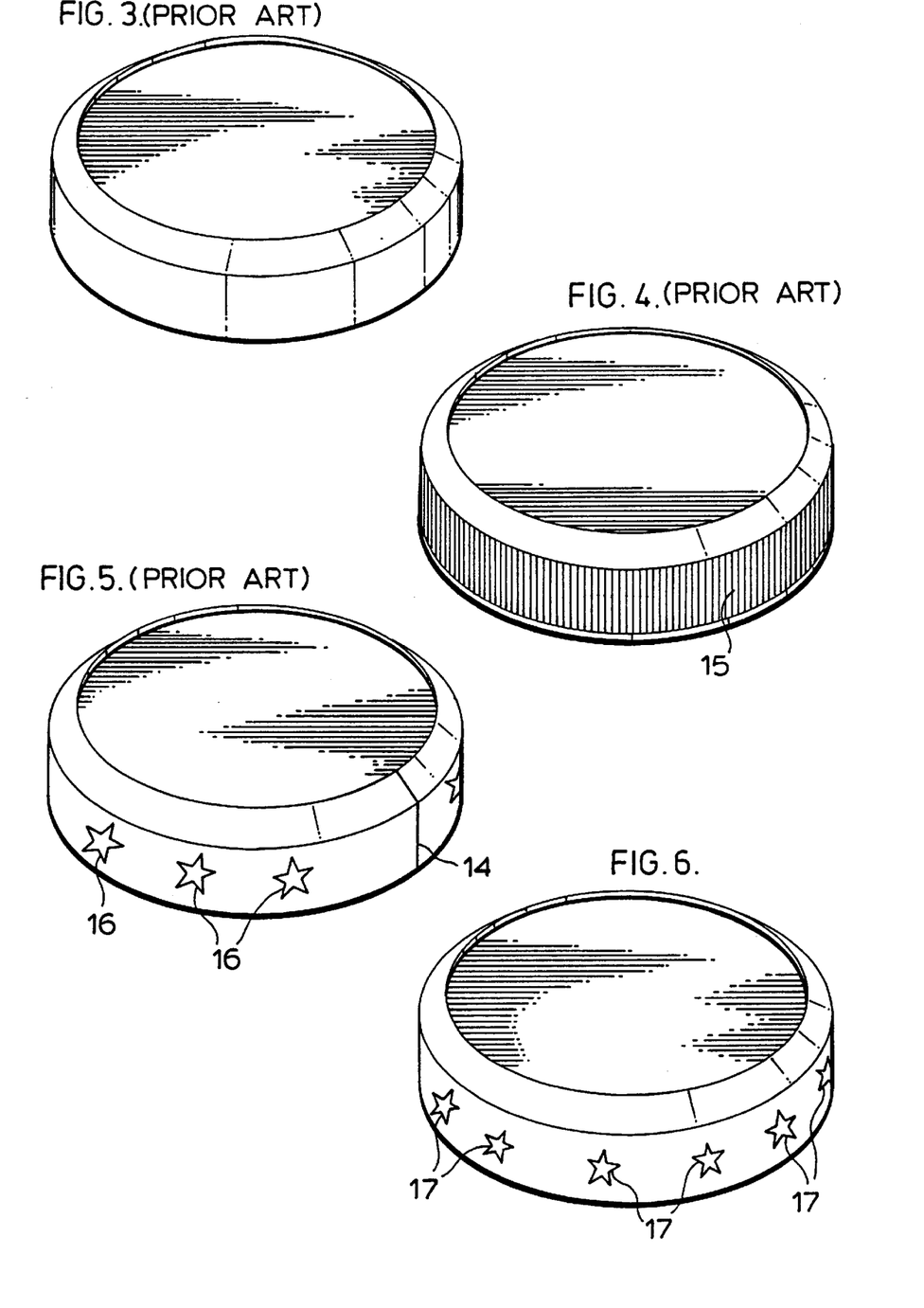
FIG. 6 is a perspective view of a cap molded in accordance with the present invention.

The perspective view, FIG. 3 shows the skirt portion 11 with no external decorations, and with one molding witness line 14.

FIG. 4 shows a regular cap having ribs 15 on the outside of the skirt; and

FIG. 5 shows a cap having decorations 16 on the outside of the skirt, being located substantially on the axis of draw of the split lower mold, from which witness line 14 occurs.

FIG. 6 is a perspective view of a cap molded in accordance with the present invention, having an absence of witness lines, and decorations 17 distributed all about the skirt, in unrestricted relation.

Figure 7:
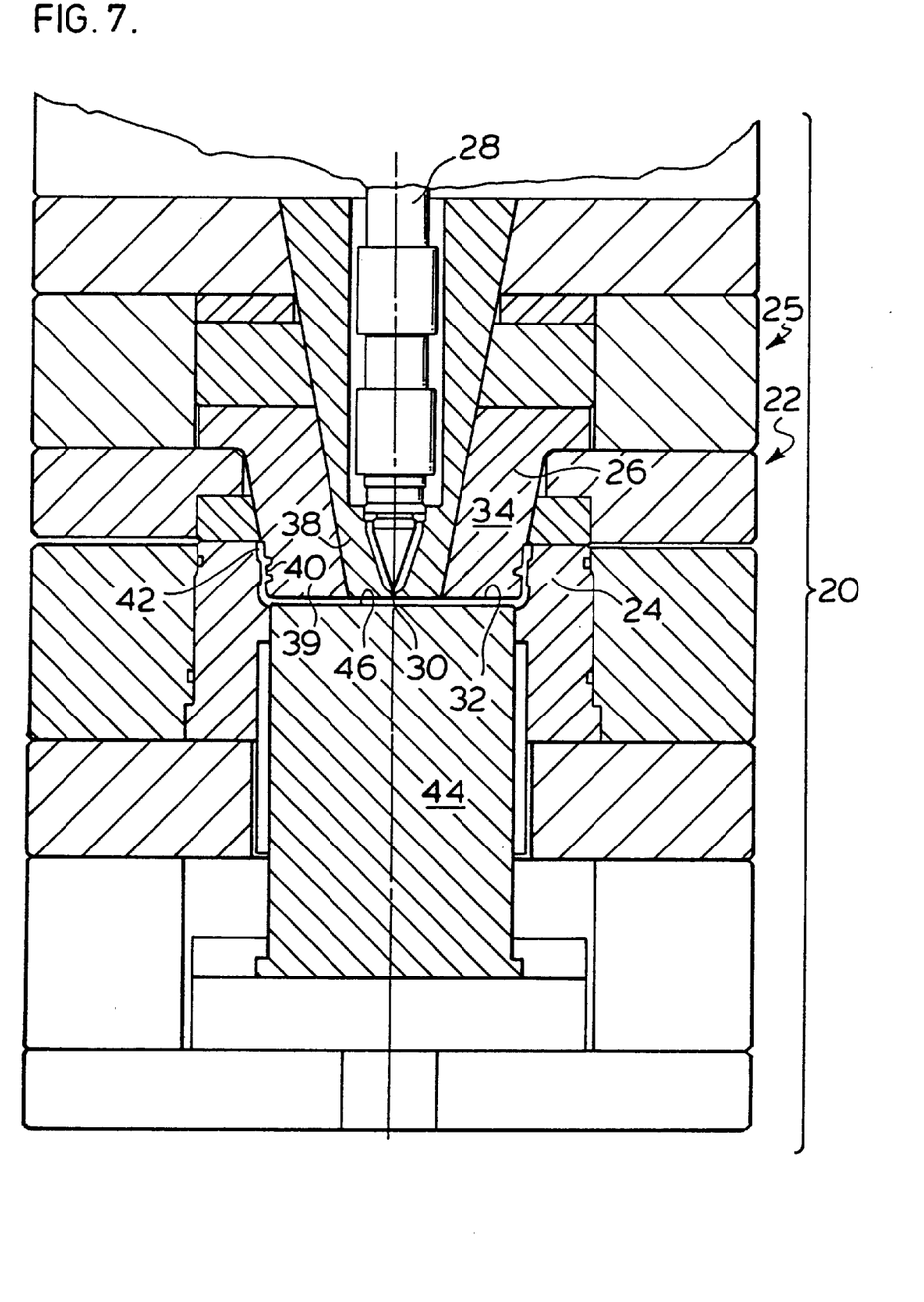
FIG. 7 is a diametrical section, in side elevation, of a single cavity injection mold in accordance with the present invention.

Referring to FIG. 7, an injection mold 20 has a lower outer mold casing 22 with a unitary, un-split cylindrical die housing 24 and an upper, core die assembly 25, having a segmented core die 26. An injection head 28 is located centrally of core die 26.

The discharge aperture 30 of injection head 28 communicates with die cavity 32, located between the die housing 24 and the core die 26.

The core die 26 is illustrated as having a plurality of three tapered die segments, of which segments 34, 38 and 39 can be seen.

The peripherally outer molding surface of core die 26 has thread lands 40 and grooves 42, to mold a thread on the radially inner face of the skirt of the cap to be molded.

The mold casing 22 has a movable cylindrical push-out portion 44, the axial end surface 46 of which forms the crown outer end face of the to-be-molded cap.

Figure 8:
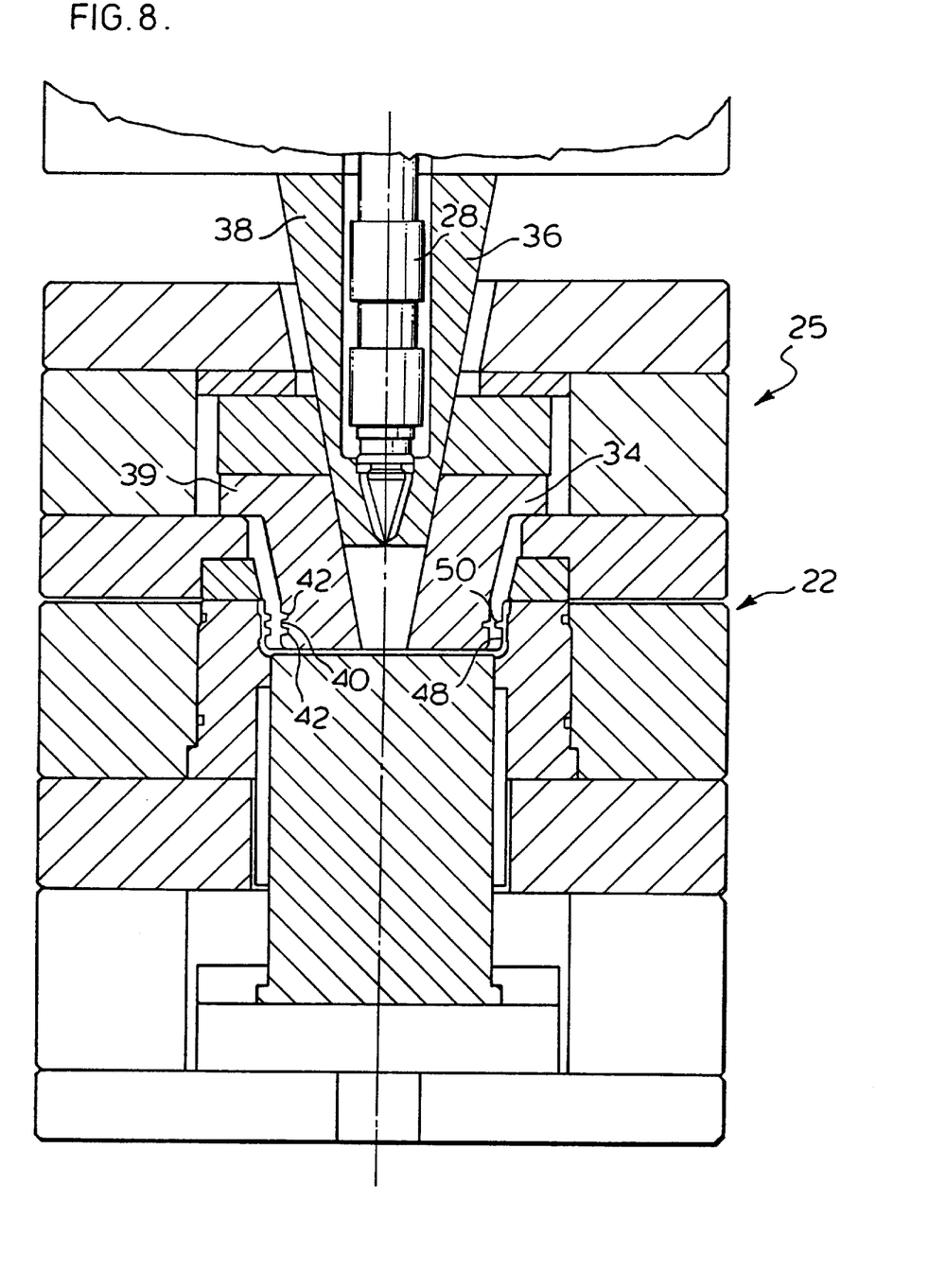
FIG. 8 is a view similar to FIG. 7, with the plastic injector and portions of the mold core die in a retracted position.

Turning to FIG. 8, this is shown after completion of the injection to form cap 48, having a single start thread 50 on the skirt inner face.

The stock injection head 28 is in an axially withdrawn position, together with tapered mold piece 38, such that tapered mold pieces 34 and 39 are retracted radially inwardly. Thus the undercuts of lands 40 and grooves 42 are withdrawn radially inwardly so as to clear the corresponding component parts of the newly molded cap 48.

Figure 9:
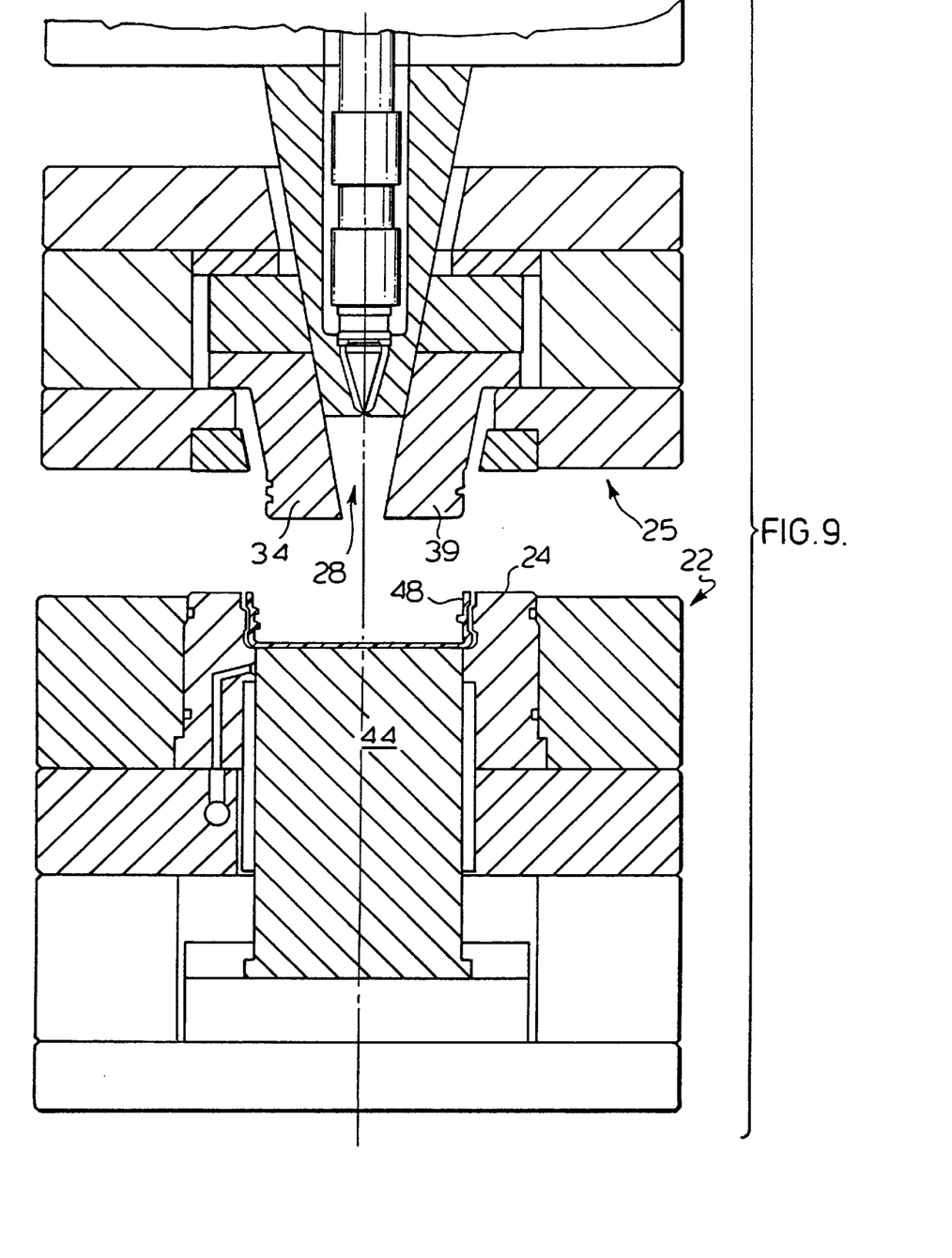
FIG. 9 is a view similar to FIGS. 7 and 8, with the injector and core die withdrawn from the molded cap and the mold body.

In this condition the whole of the core die assembly 25, together with injection head 28 may be axially withdrawn clear of the mold casing 22, as shown in FIG. 9. Also, in FIG. 9, the molded cap 48 is shown as having cooled down and contracted radially inwardly, away from the undercuts or protrusions of die 24, such that the cap 48 is in a condition to be removed from the die 24.

Figure 10:
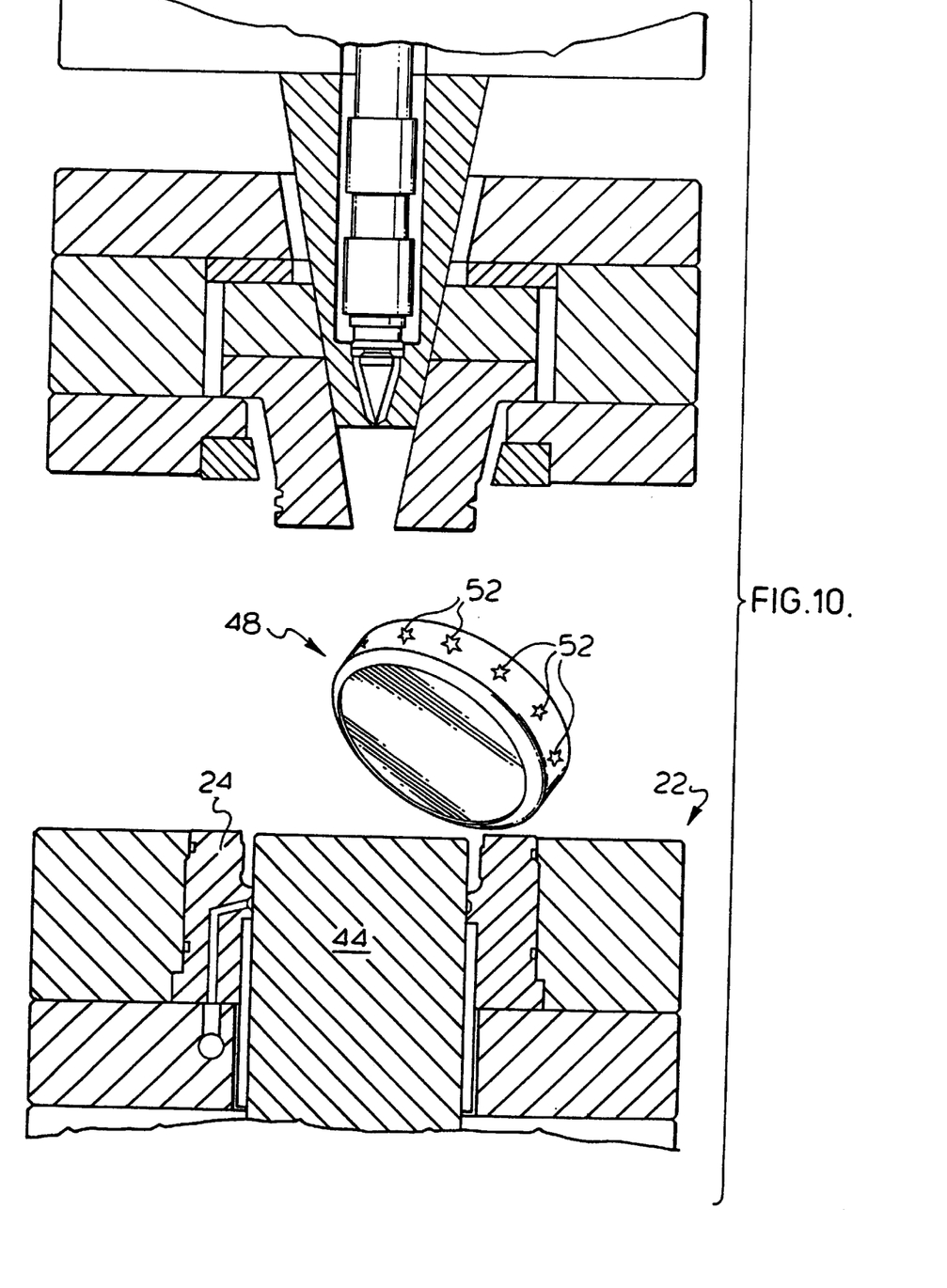
FIG. 10 is a view similar to FIG. 9, showing the knock-out extended to its operative position and the subject molded cap ejected from the mold.

Turning to FIG. 10, the push-out portion 44 of the mold casing 22 has been driven upwardly so as to discharge the cap 48 from the apparatus.

It will be seen that the cap 48 has a continuous array of decorations 52 about the periphery of its skirt, which may stand proud of the skirt surface or be undercut therein.

A lateral air blast may then displace the cap 48 sideways to a receiver, (not shown).

The radial extent of the decorations 52 is primarily a function of the diameter of the cap 48 and, the thermal expansion/contraction coefficient of the plastic from which the cap 48 is molded. It will be noted that no witness lines need exist, the cylindrical annular die housing 24 being of unitary construction.

Alternative cap displacement means include an air poppet arrangement to blow the cap 48 up and out of the lower mold assembly 22, or outwardly retractable extraction suction cups.

Figure 11:
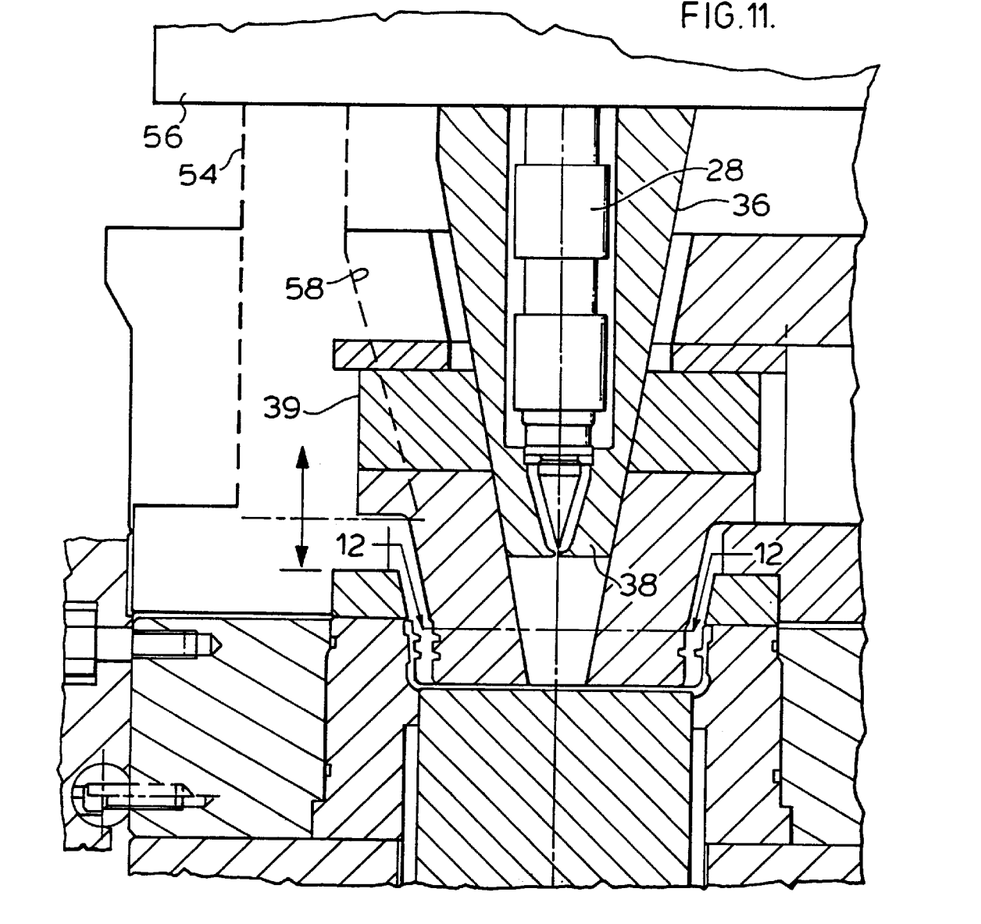
FIG. 11 is a view similar to FIG. 8, showing the actuator mechanism for retraction of the core die.
Figure 12:
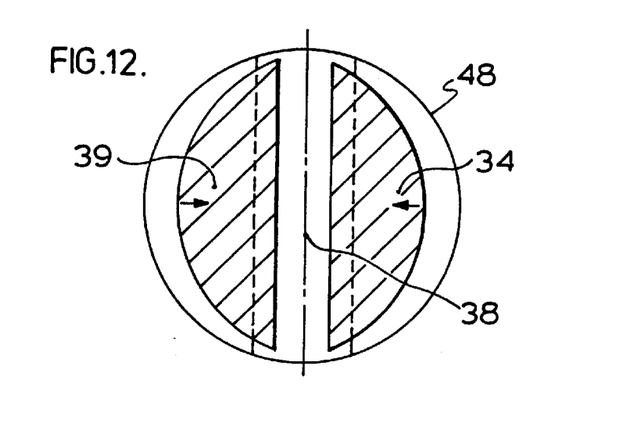
FIG. 12 is a diagrammatic plan view taken at 12—12 of FIG. 11.

Turning to FIGS. 11 and 12, the mold top had 56 is shown partially retracted, including first the withdrawal of injection head 28 and die segment 38 together. This action is achieved by way of a pair of sequential cams (not shwon), having a lost-motion connection with the mold top half 56.

One cam 54 (shown in phantom) connected in sliding relation with segment 39 of the core die 26 is moved upwardly with the unlatched mold top half 56. This causes the cam face 58 to slide upwardly along the die segment 39. The die segment 39 is thus slid radially inwardly, to its inward, retracted position, clear of the molded cap 48.

The opposite die segment 34 is similarly retracted inwardly by a cam, (not shown).

COMMERCIAL UTILIZATION

A cap having enhanced decorative capabilities for the skirt portion offers considerable incentive to sales promotion, together with a functional, lettering or labelling capability, such as a safety label.

What is claimed:

1. The method of injection molding a hollow body with a closed circular end wall and a depending skirt portion defining a substantially cylindrical side wall and having a screw thread on an inner surface of said side wall and an outer surface having surface relief formed by at least one area displaced radially with respect to a generally cylindrical outer surface of said side wall, said outer surface being free of witness lines, in a mold having a unitary outer die against which said skirt portion and said surface relief are molded, said outer die having a generally cylindrical inner mold surface provided with at least one portion displaced radially therefrom, and a contractible inner core die that defines in an expanded condition a generally cylindrical outer mold surface having mold portions defining a screw thread thereon and said inner core die having an inner core die end wall to form said closed circular end wall, said inner core die being contractible radially inwardly and wholly retractable axially outwardly from within the outer die through one end thereof, and having an injector located therein, including the steps of:

assembling the inner and outer die to form an enclosed cavity for said body;

injecting plastic in fluent form through said injector, at an interior wall of said cavity, to form the body with a mar-free outer surface substantially blemish free;

cooling the plastic, at least partially withdrawing said injector, and contracting the inner core die radially out of contact with the formed skirt portion of the body;

retracting the contracted inner core die axially from the interior of said body to enhance cooling of the molded body, whereby the body contracts thermally to withdraw said skirt portion thereof radially out of contact with said mold outer die, and ejecting the molded body from the unitary outer die.

2. The method as set forth in claim 1, wherein said inner core mold is contracted in sequential stages, to effect radial separation between molded interior portions of said body and corresponding die portions upon which said interior portions are formed.

3. The method as claimed in claim 1, wherein said molded body is ejected from said outer die.

4. The method of claim 1, wherein the hollow body is cylindrical of diameter not less than 2 inches and the thermal contraction of the body is in the range of 0 inches to 0.030 inches diametrically.

5. The method of claim 4, wherein a ten second molding cycle time is used and thermal contraction is in the range of 0.005 inches to 0.010 inches.

* * * * *